United States Patent [19]
Winter, IV.

[11] Patent Number: 4,867,598
[45] Date of Patent: Sep. 19, 1989

[54] TAPERED DOVETAIL MORTISE AND TENON JOINT STRUCTURE

[76] Inventor: Amos G. Winter, IV, Pinnacle Springs Rd., Spofford, N.H. 03462

[21] Appl. No.: 109,233

[22] Filed: Oct. 16, 1987

[51] Int. Cl.⁴ .............................................. B25G 3/08
[52] U.S. Cl. ..................................... 403/381; 403/331; 5/300
[58] Field of Search ....................... 403/381, 382, 331; 5/300

[56] References Cited

U.S. PATENT DOCUMENTS

| | | | |
|---|---|---|---|
| 2,614,302 | 10/1952 | Johnson | 403/381 |
| 4,019,298 | 4/1977 | Johnson | 52/594 |
| 4,492,489 | 1/1985 | Kantorowich | 403/319 |

FOREIGN PATENT DOCUMENTS 30547  8/1933  Netherlands ......................... 403/381

*Primary Examiner*—Andrew V. Kundrat
*Attorney, Agent, or Firm*—George W. Dishong

[57] ABSTRACT

A tapered dovetail mortise and tenon joint is formed within typically a post and beam or within two joists which intersect perpendicular to each other. The tapered dovetail shaped mortise portion cavity is shaped to interfit with a dovetail shaped tenon portion. The tenon portion has incorporated therein a plurality of acute angles which permit easy assembly, cause precise alignment and cause forces to be created when components are connected using the joint which forces tend to bring the mated components into very rigid tightly interfitted assembled relationship. The joint, when assembled, is not visible because of the unique configuration of the mortise and tenon portions. A very large load bearing capability of inherent in the joint partly because of the large mating surface incorporated into the side surfaces and the bottom surfaces and also partly becuase the integrity of the chords and the web of the "I-Beam" cross section of the components is not violated. The acute angle associated with the side surfaces, the acute angle associated with the bototm surface and the acute angle associated with the outward end surface, all of the tenon portion, and the related surfaces and angles of the mortise portion all cooperate in such a manner as to force the joint more tightly together as a downward loading is increased.

30 Claims, 6 Drawing Sheets

TAPERED DOVETAIL MORTISE AND TENON JOINT STRUCTURE

BACKGROUND OF THE INVENTION

1. FIELD OF THE INVENTION

This invention relates to the field of joinery and systems for joining component parts together. More particularly this invention relates to timber joinery and joints which are effective to join various beams to posts, purlins to rafters and other components to be joined which are encountered during construction procedures such as stair treads and risers to stringers, the joints not being visible.

2. DESCRIPTION OF THE PRIOR ART

The rising cost of labor and materials have made building construction and especially the construction of homes increasingly more expensive. In addition the cost of heating and cooling a building has increased many times over in recent years. In order to keep the costs of construction, heat, cooling and maintenance within reasonable limits and therefore affordable to the general public, innovations have been necessary. In part because of the availability of prefabricated structure-wall and curtain-wall panels, there has been a return to the post and beam type of modular construction which lends itself to a prefabrication of the many construction components away from the construction site. By prefabrication and precutting many of the components of the structure at a manufacturing facility, many procedures may be used to improve the fabrication efficiency and improve the quality of the components as well as reduce the construction time.

Many types of joints have been and are currently being used by builders who are building post and beam types of structures. There are joints called ANCHOR-BEAM; KNEE-BRACE; SCARF; TUSK TENON; CORNER JOINTS; TONGUE AND FORK; COLLAR-TIE; to name but a few. However, perhaps the most basic timber-framing joint is the MORTISE and TENON. It would be desireable, because of the simplicity of the joint, to be able to use it for many of the joining applications. However, the joint should be designed to carry only a light load. Adding a shoulder to the mortise and tenon gives it an entirely different load-bearing quality. Other simple and useful joints are the DOVETAIL and the HOUSED-DOVETAIL JOINTS which adversly effect the strength of the beam because the top chord portion of the mortised beam is violated. The simple dovetail is commonly used to join the smaller members, such as joists and purlins and is designed to carry loads. The housed-dovetail is unique in that it is the only major timber connection that does not use a peg. The joint is designed so that the timber can be placed in the structure after the "bents" have been raised. That is to say that the female portion or the "mortise" portion does not have to be moved away in order to make the connection to the beam. The wedging effect of the dovetail and the weight of the beam itself lock the joint in place. The "housing" helps the timber retain its strength at the connection. The dovetail joint is designed to have a taper in a single plane with a resulting limited rigidity. The TUSK TENON JOINT is stronger, in part, because it does not violate the structure of the mortised member and it can be used in place of the housed-dovetail except that it must be pegged through the tenon in order to hold the joint together.

Many of the joints and methods of timber joinery are clearly explained in the book, *Building The Timber Frame House The Revival of A Forgotten Craft*, Tedd Benson and James Gruber, Published by Charles Scribner's Sons. The various joints are illustrated on pages 40–50.

A dual tapered dovetail shaped mortise and tenon joint is disclosed in U.S. Pat. No. 4,019,298 by Johnson. The joint is described as a dual tapered dovetail shaped mortise formed within a joist to receive a dual tapered dovetail shaped tenon extending from a beam. Laterally oriented cavities are disposed within opposite faces of the mortise to receive correspondingly configured ridges formed integral with the mating tenon. The resulting frictional interlock between the mortise and the tenon created by two forces acting in opposition to one another rigidly secures the beam to the joist without play therebetween. It should be further noted that the outer surface of the dual tapered tenon is non-parallel to the end surface of the beam integral with the tapered tenon, whereby the thickness of the tenon diminishes in the downward direction. Thus the tenon is tapered in two planes, which planes are normal to one another. The length of the tenon is the same as the vertical dimension of the beam integral with the tenon.

In U.S. Pat. No. 4,492,489, Mortice and Tenon Joint there is disclosed a mortice and tenon joint of two structural members which avoids the protrusion of the tenon beyond the mortice. Across the tenon of one member there is cut a dovetail aperture or slot and a movable tapering wedge of similar dovetail cross-section is slidably housed within a tapering channel also of similar dovetail cross-section which crosses the mortice of the other member such that when the tenon is inserted wholly into the mortice the wedge may be driven along the tapered channel to become firmly engaged within the dovetail aperture or slot thus to lock the members together and prevent them from separating until the wedge is withdrawn.

Further examples of prior art use of the dovetail shaped mortise and tenon joint may be found in U.S. Pat. Nos. 3,090,086, directed to the cabinet making art; 3,683,429, illustrating cross frame members secured to the side-frame members of a bed frame; 2,793,407 and 4,643,607, teaching the use of dovetail joints in furniture; and 2,392,551, 3,148,477, 3,396,499, 3,410,044, 3,562,988, and 3,664,011, disclosing the aligning of structural members of means of dovetail joints.

SUMMARY OF THE INVENTION

The present invention, in its most simple embodiment, is directed to a joint adapted to be used for connecting at least two components such as for example, a wooden beam to a wooden post where the beam and post are typically a part of a timber frame house or structure. The joint of the present invention has a unique configuration so that it can be used for essentially all of the necessary connections of two or more timbers which are encountered in the construction of a timber frame house or other timber frame structure. The joint of the present invention differs from prior art joints in that it can be used to join a member to a continuous plane. It is not necessary, in order to assemble the joint to enter the mortised member from atop the member and when the joint is assembled there is no substantial evidence of the joint. Particularly, the present invention is a tapered dovetail mortise and tenon joint structure comprising in combination a first component and a second component. A tenon portion is configured onto a first surface of the first component and extends gradually from the first surface when going from the top toward the bottom of the tenon. The tenon has two side surfaces each having an inner defining edge and an outer defining edge and each side surface forms a third acute angle with the first surface, the outer defining edges meet the inner defining edges at a top edge of the tenon portion. The top edge is substantially in the same plane as the first surface of the first component. The inner edges are downwardly sloping towards one another and lay in the plane of the first surface forming another acute angle therebetween. The outer defining edges slope downwardly from the top edge and outwardly from the first surface and toward one another forming respectively a first acute angle with the first surface and a second acute angle therebetween. The two side surfaces terminate at a bottom surface, which bottom surface is defined by an inner and an outer bottom edge. The bottom surface forms a fourth acute angle with the first surface. Also an outward end surface of the tenon is defined by the two outer defining edges, the outer bottom and the top edge. A second surface of the second component has a mortise portion cavity therein. The mortise portion cavity has interior walls and angles to match the contour or geometry of the side, outer end and bottom surfaces, the inner and outer defining edges top and bottom edges, and the first, second, third and fourth acute angles. All of the tenon portion elements and the mortise portion elements are configured so that the tenon and the mortise portion when interfitted or mated, will be in a tightly interfitting relationship.

It is a primary object of the invention to provide a tapered dovetail shaped mortise and tenon joint structure which is useful to interlock or connect components to one another, such as for example structural components such as posts to beams, purlins to rafters, joists to beams, and rafters to rafters or rafters to ridge pole and stair treads to stringers.

Another primary object of the invention is to provide a joint which is easy to manufacture or configure onto the components and which is integral with the components which are being connected together and which does not require the use of non-integral connecting elements such as bolts, pegs, or nails.

A further object of the present invention is to provide a joint where the details of the joint configuration are not visible when the components connected by the joint are connected together.

A still further object of the present invention is to provide a joint which because of the geometry or configuration causes the components being connected by the joint to be captured and to be automatically positioned.

A yet further object of the present invention is to provide a joint which has increased load bearing capacity due in part to the unique combination of angles, tapers and complementary matching surfaces between the mortise and the tenon portions of the joint and significantly due, in part, to the fact that the joint configuration or geometry does not effect the "chord" or the "web" or otherwise violate the integrity of the "I-Beam" cross-section which is inherent in the timber beam and essential to provide the spanning load carrying strength of the beam.

Another further object of the present invention is to provide a joint in which the tenon portion is substantially horizontally insertable into the mortise portion and which upon insertion the tenon portion is captured and aligned with the mortise portion forming a tightly interfitting connection of the two components upon which the tenon and mortise portion of the joint have been configured.

These and further objects of the present invention will become apparent to those skilled in the art after a study of the present disclosure of the invention.

DESCRIPTION OF THE PREFERRED EMBODIMENTS

In order to describe the details and the advantages of the joint disclosed herein, essentially only two embodiments of the invention will be described. It is of course understood that many variations may be made to the basic geometric configuration of the joint, all of which would be obvious from those few variations to be described herein. Additionally, while the joint disclosed has many uses for the joining of various types and sizes of components the joint will be described principally as it would be used with or be related to the wood frame construction field and particularly structural components like posts and beams. The joint could be configured onto components of material different from wood and be used to connect such components, however, the detailed discussion of the invention will be directed to wood or timber as the material of the components onto or into which the joint is configured or manufactured.

Figure 1:
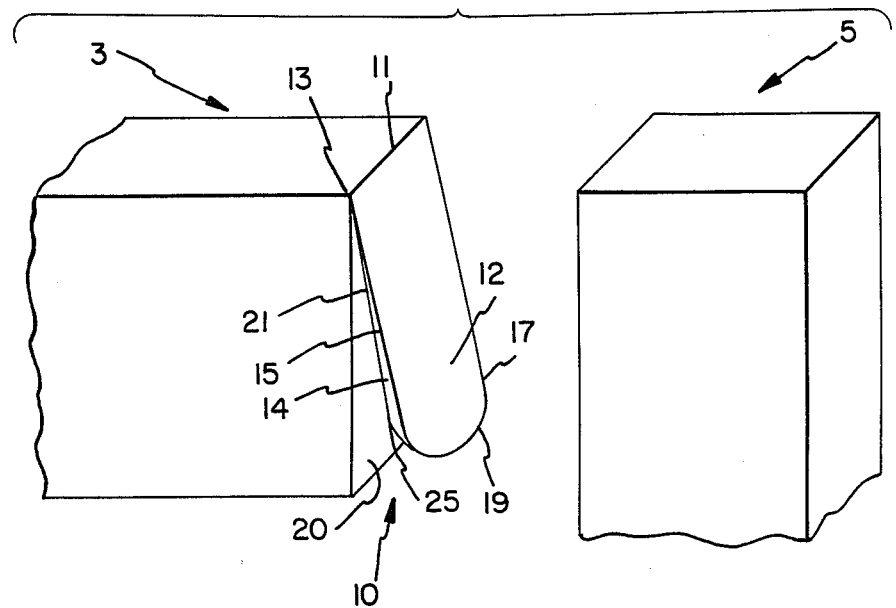
FIG. 1 is a perspective view of one embodiment for the joint structure.
Figure 2:
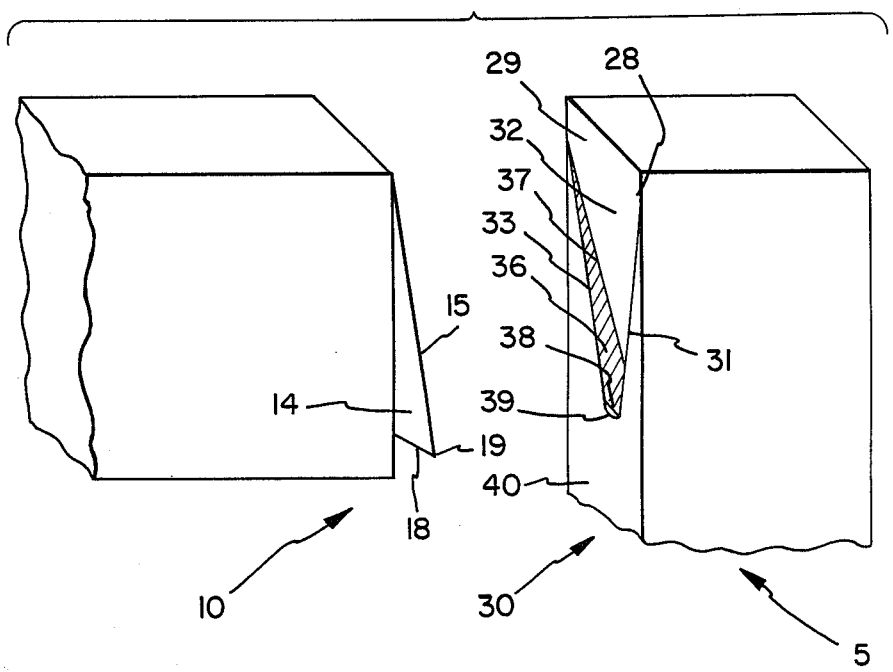
FIG. 2 is a second perspective view of the same one embodiment for the joint structure as shown in FIG. 1.
Figure 3:
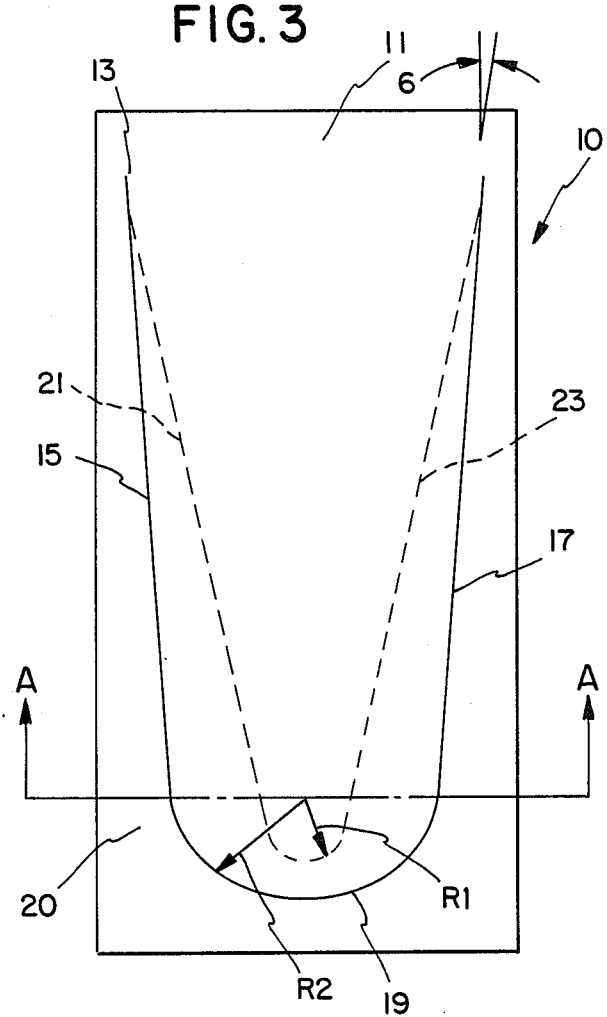
FIG. 3 is a front view of the tenon portion of the one embodiment of the invention.
Figure 4:
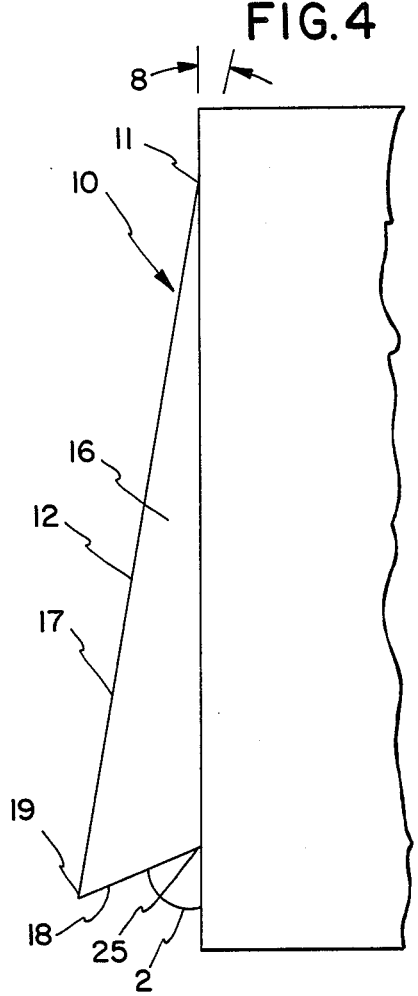
FIG. 4 is a side view of the tenon portion of the one embodiment of the invention.
Figure 3A:
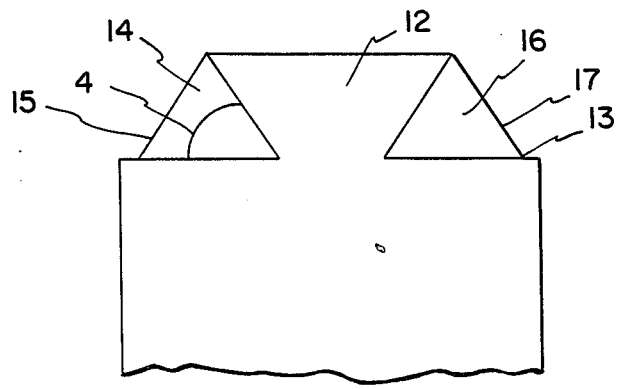
FIG. 3A is a cross-section view of the tenon portion of the one embodiment of the invention.

Referring now to FIGS. 1, 2, 3, 3A and 4, there is shown the end of a beam 3 having the tenon portion 10 of the tapered dovetail mortise and tenon joint structure cut or machined onto a first surface 20. The tenon portion 10 begins at a top edge 11, which top edge 11 need not be coincident with the top edge of the first surface 20. The outward end surface 12 gradually tapers away from first surface 20. The outward end surface 12 terminates at the bottom at an outer bottom edge 19 and at the sides at first and second outer edges 15 and 17. The gradually protruding tenon portoin 10 also has two side surfaces a first and a second side surface 14 and 16 and a bottom surface 18. The bottom surface 18 is shaped like a portion of a cone having a top edge 19 and a bottom, inner bottom edge 25 which are, of course semi-circular, but the bottom surface 18 could also could be planar and the inner and outer bottom edge linear so long as the corresponding surface of the mortise portion of the joint was matching. The side surfaces form an acute angle 4 with the first surface 20, and the bottom surface 18 forms an acute angle 2 with the first surface 20. Further, the substantially planar outward end surface 12 forms an angle with the first surface 20, which angle is the acute angle 8 or could be described as an obtuse angle 180°—angle 8. The first and second outer edges 15 and 17 form the acute angle 6 with the vertical plane of FIG. 4 and an acute angle between the first and second outer edges 15 and 17 of typically, although not necessarily, two times the value of angle 6. The outward end surface 12 being more narrow at the lower portion than at the upper portion permits a more easy assembly of the components 3 and 5.

Figure 5:
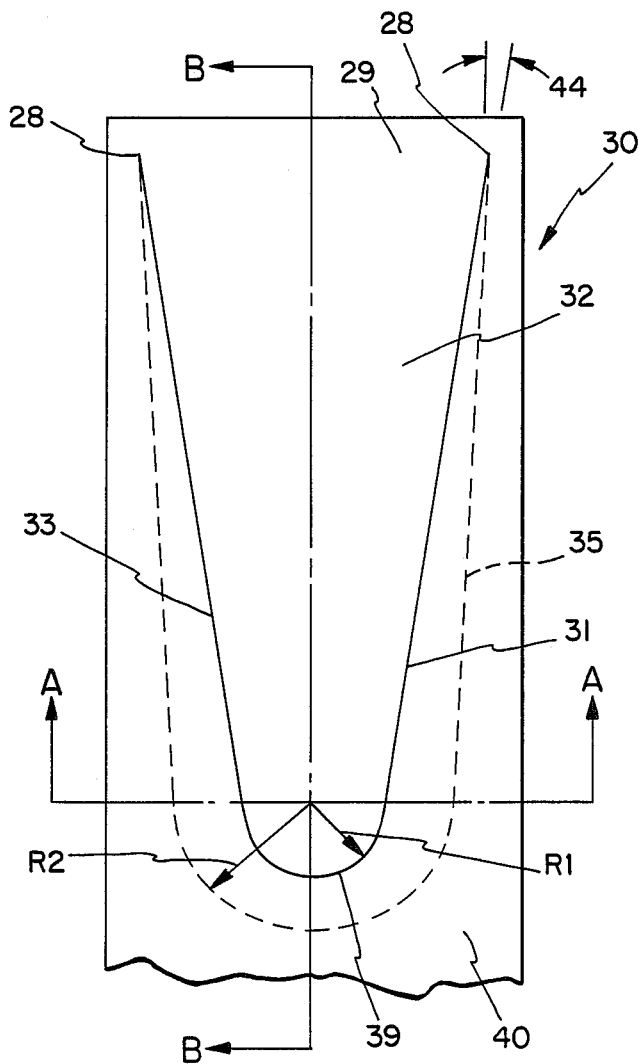
FIG. 5 is a front view of the mortise portion of the one embodiment of the invention.
Figure 5B:
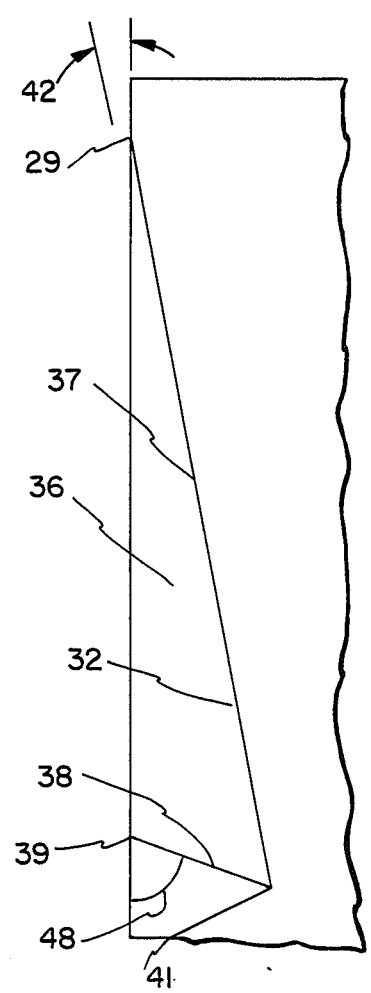
FIG. 5B is a cross section B—B side view of the mortise portion of the one embodiment of the invention.
Figure 5A:
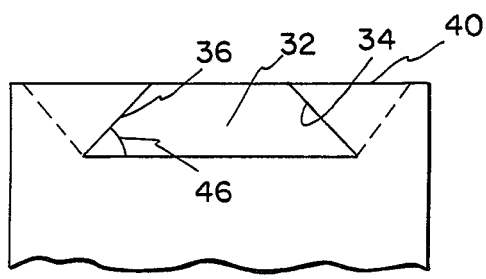
FIG. 5A is a cross section A—A end view of the mortise portion of the one embodiment of the invention.

Referring now to FIGS. 2, 5, 5A and 5B there is shown a mortise portion 30 as a cavity cut into components 5 on a second surface 40 where component 5 may be a timber post. The mortise portion 30 has an inward mortise end surface 32, two mortise side surfaces 34 and 36 and a bottom mortise surface 38. The angle 42 at which the surface 32 tapers inward into the post 5 is substantially equal to the acute angle 8 of the tenon portion 10. The angle 48 is substantially equal to angle 2 and angle 44, the acute angle formed between the first and second inner mortise edges 35 and 37, and the plane of section B—B is substantially equal to acute angle 6. The top mortise edge 29, the bottom inner and outer edges 41 and 39, the inner and outer first and second mortise edges 35, 37, 31 and 33, all define the mortise surfaces and matingly match the complementary edges of the tenon portion 10. Where the second component 5 is a beam and first component 3 is a joist or another beam, note that the mortise portion cavity 30, is configured and dimensioned so that the chords and the web of the inherent "I-Beam" cross-section of a beam to which a joist or another beam is attached or connected by means of the joint of this invention does not violate the integrity of such "I-Beam" cross-section.

The embodiment of the tapered dovetail mortise and tenon joint of FIGS. 1–5B is easily fabricated or configured onto the first and second components 3 and 5 with the use of a router which is tapered so that the wider or larger diameter is at the bottom of the cutter and the bottom of the cutter is essentially flat. The shaft of the cutter is tilted in the axial direction by an angle equal to the acute angle 42. The cutter is plunged into surface 40 of second component 5 and advanced from the top mortise edges 29 toward the inner bottom mortise edge 41 in such a manner as to produce the slope or taper of the inward mortise end surface 32. The angle 44 is produced as a result of the cutter entering the second surface 40 at the top mortise edges 29 and exiting at the top mortise edge 29 creating the junctions 28 having a distance therebetween greater than the bottom diameter of the cutter. The angles 46 are the same as the angles of the taper of the cutter. The angle 48 is greater than (less acute) the angles 46 because of the compounding of the cutter tilt angle and the angle of the taper of the cutter.

Figure 6:
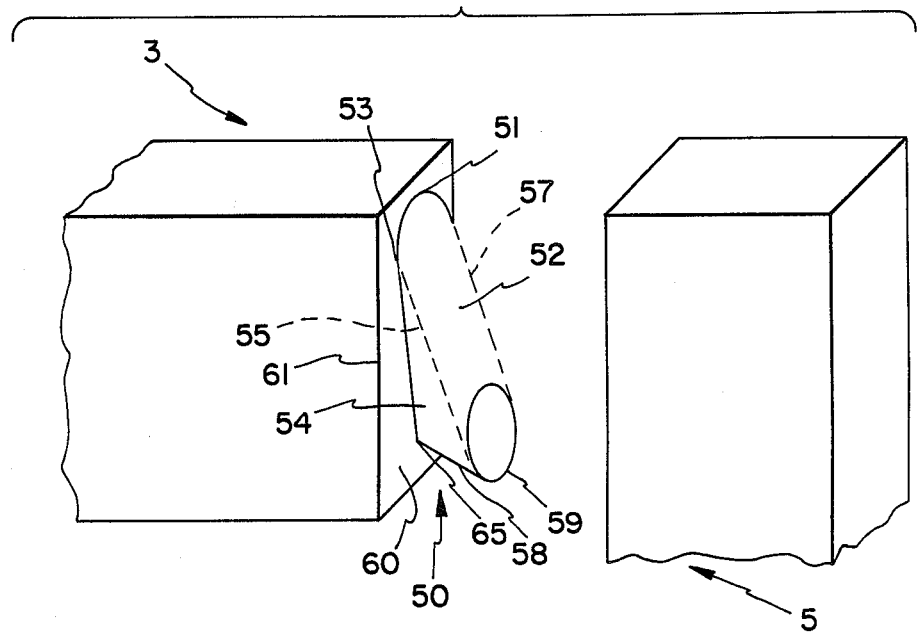
FIG. 6 is a perspective view of a second embodiment for the joint structure.
Figure 7:
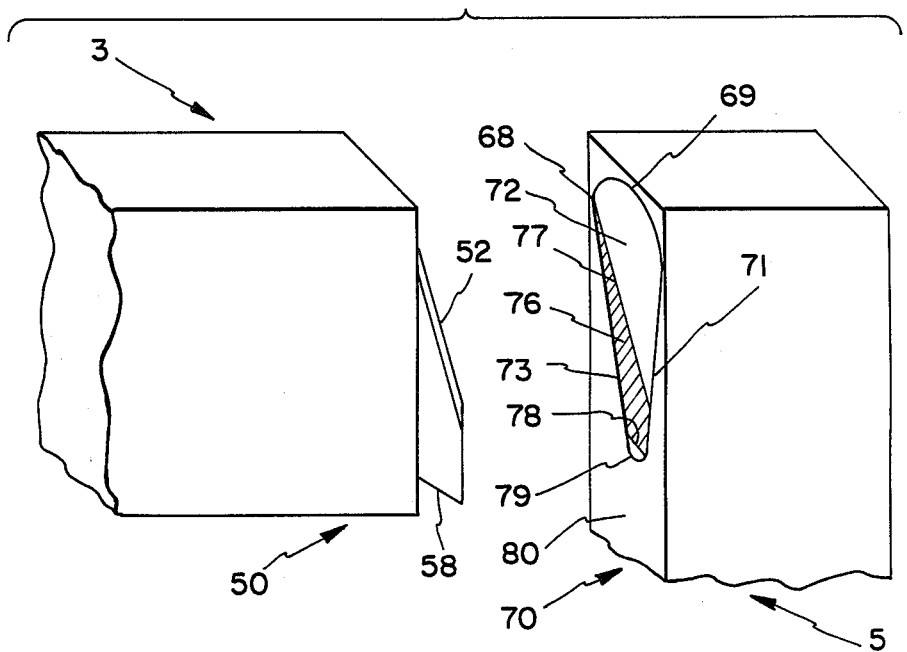
FIG. 7 is a second perspective view of the second embodiment for the joint structure as shown in FIG. 6.
Figure 8:
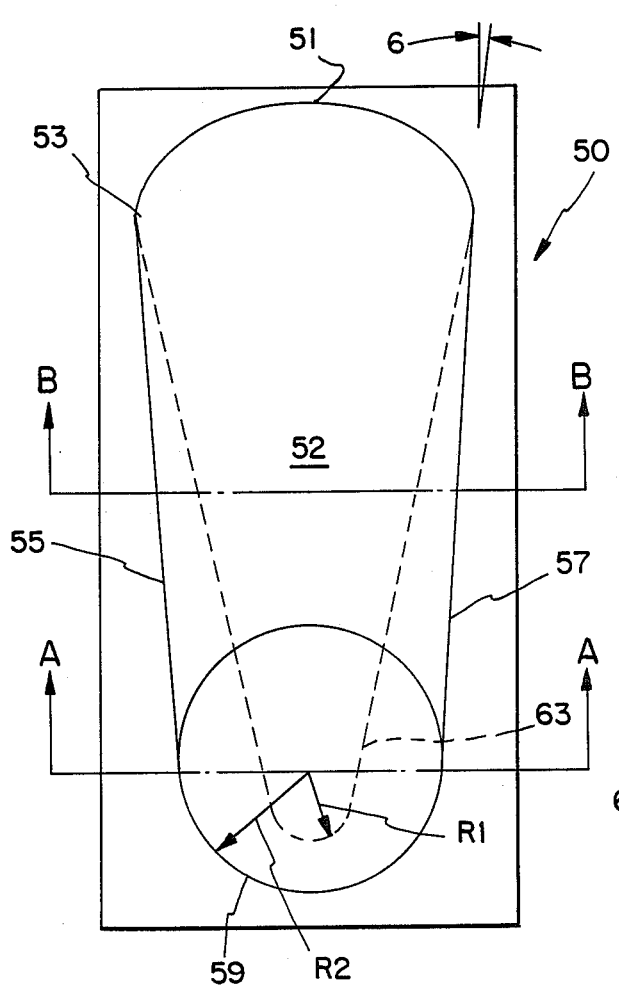
FIG. 8 is a front view of the tenon portion of the second embodiment of the invention.
Figure 9:
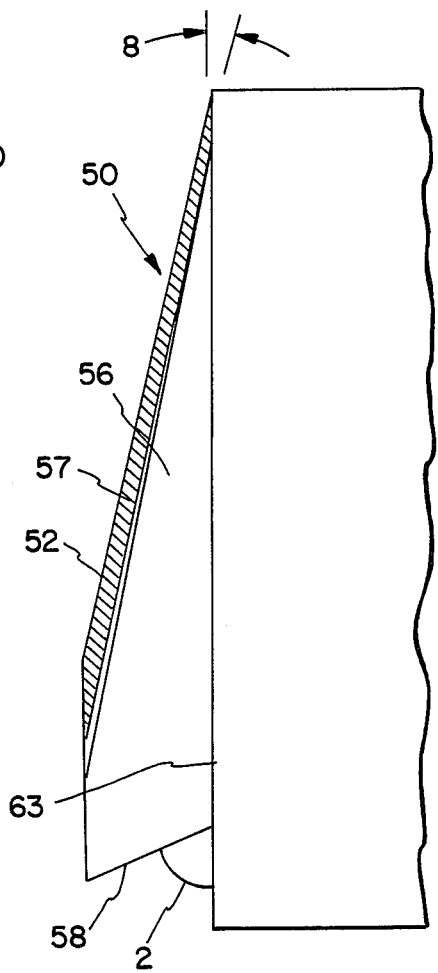
FIG. 9 is a side view of the tenon portion of the second embodiment of the invention.
Figure 8A:
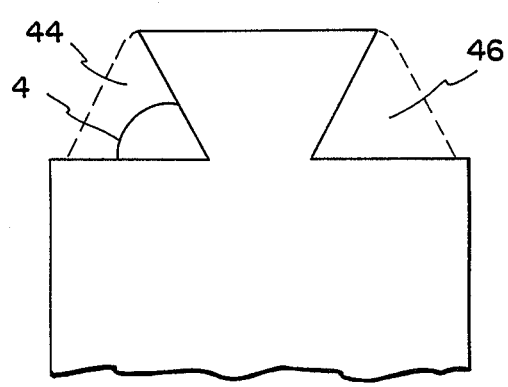
FIG. 8A is a cross-section A—A end view of the tenon portion of the second embodiment of the invention.
Figure 8B:
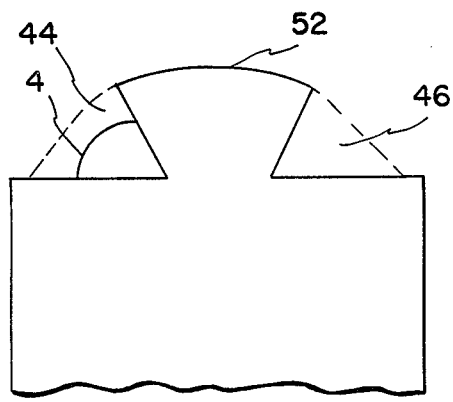
FIG. 8B is a cross-section B—B end view of the tenon portion of the second embodiment of the invention illustrating the non-planar outward end surface.

Referring now to FIGS. 6, 7, 8, 8A, 8B and 9, there is shown the end of a beam 3 having the tenon portion 50 of the tapered dovetail mortise and tenon joint structure cut or machined onto a first surface 60. The tenon portion 50 begins at a top edge 51, which top edge 51 need not be coincident with the top edge of the first surface 60. The outward end surface 52 gradually tapers away from first surface 60. The outward end surface 52 terminates at the bottom at an outer bottom edge 59 and at the sides at first and second outer edges 55 and 57. The gradually protruding tenon portion 50 also has two side surfaces a first and a second side surface 54 and 56 and a bottom surface 58. The bottom surface 58 is shaped like a portion of a cone having a top edge 59 and a bottom, inner bottom edge 65 which are, of course semi-circular, but the bottom surface 58 could also could be planar and the inner and outer bottom edge linear so long as the corresponding surface of the mortise portoin of the joint was matching. The side surfaces form an acute angle 4 with the first surface 60, and the bottom surface 58 forms an acute angle 2 with the first surface 60. Further, the substantially nonplanar outward end surface 52 forms an angle with the first surface 60, which angle is the acute angle 8 or could be described as an obtuse angle 180°—angle 8. The first and second outer edges 55 and 57 form the acute angle 6 with the vertical plane of FIG. 9 and an acute angle between the first and second outer edges 55 and 57 of typically, although not necessarily, two times the value of angle 6. The outward end surface 52 being more narrow at the lower portion than at the upper portion permits a more easy assembly of the components 3 and 5.

Figure 10:
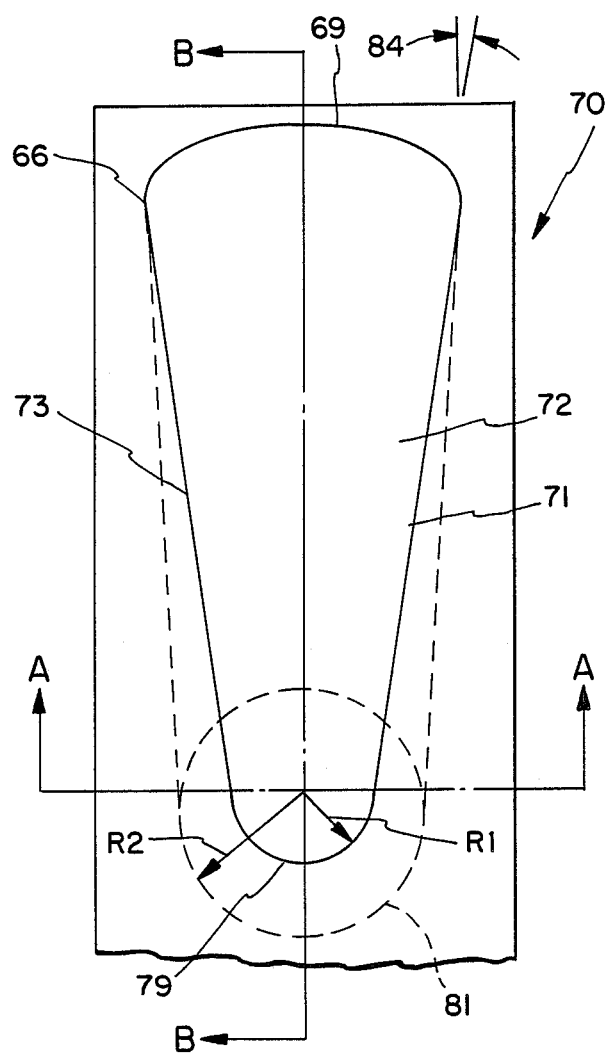
FIG. 10 is a front view of the mortise portion of the second embodiment of the invention.
Figure 10B:
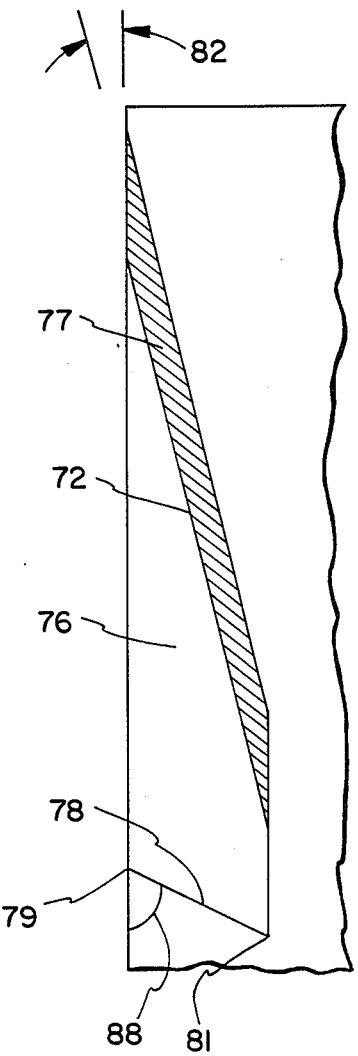
FIG. 10B is a cross-section B—B side view of the mortise portion of the second embodiment of the invention.
Figure 10A:
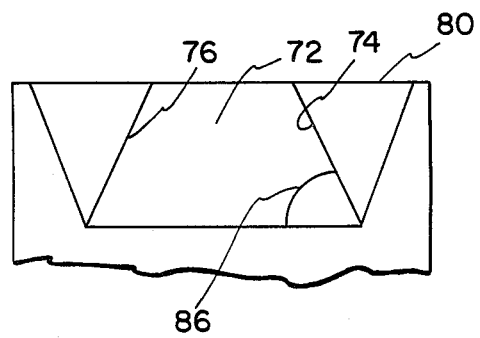
FIG. 10A is a cross-section A—A end view of the mortise portion of the second embodiment of the invention.

Referring now to FIGS. 7, 10, 10A and 10B there is shown a mortise portion 70 as a cavity cut into component 5 on a second surface 80 where component 5 may be a timber post. The mortise portion 70 has an inward mortise end surface 72, two mortise side surfaces 74 and 76 and a bottom mortise surface 78. The angle 82 at which the surface 72 tapers inward into the post 5 is substantially equal to the acute angle 8 of the tenon portion 50. The angle 88 is substantially equal to angle 2, and angle 84, the acute angle formed between the first and second inner mortise edges 75 and 77, and the plane of section B-B is substantially equal to acute angle 6. The top mortise edge 69, the bottom inner and outer edges 81 and 79, the inner and outer first and second mortise edges 75, 77, 71 and 73, all define the mortise surfaces and matingly match the complementary edges of the tenon portion 50. Where the second component 5 is a beam and first component 3 is a joist or another beam, note that the mortise portion cavity 70, is configured and dimensioned so that the chords and the web of the inherent "I-Beam" cross-section of a beam to which a joist or another beam is attached or connected by means of the joint of this invention does not violate the integrity of such "I-Beam" cross-section.

The tapered dovetail mortise and tenon joint structure illustrated by FIGS. 6–10B differs from the structure illustrated by FIGS. 1–5, basically in the method by which the mortise portion 70 cavity is made or machined into the second component 5. Essentially, the same router cutter as used to make the cavity of FIGS. 2, 5, 5A and 5B not tipped or tilted relative to the second surface 80 may be used and will result in the mortise portion 70 cavity in the second component 5. The rate at which the cutter plunges relative to the rate at which it advances from the top mortise edge 69 toward the inner bottom mortise edge 81 defines the acute angle 82. The inward end mortise surface 72 will consequently be non-planar when such a rotary router type cutter is used and the inner mortise edges 75 and 77 will also be radiused by an amount depending upon the plunge rate and the cutter taper. The angle 70 is produced similarly to the way in which angle 44 is produced. It should also be noted that angles 88 and 86 are substantially equal because of the non-tilted cutter.

The members 3 and 5 onto which the tenon 50 and the mortise 70 are configured may be in positions relative to each other which are not in perfect alignment for assembly of the joint. That is, this embodiment of the invention permits more ease of assembly in that, for example, the member 3 may be rotated from a position which is perpendicular to the member 5 and the joint will, upon insertion of the tenon 50 into the mortise 70 draw the members 3 and 5 into a tight a proper fit and orientation. This desirable and unexpected characteristic is primarily due to the unique configuration of the joint of this invention such as the non-planar surface 52 of tenon 50 and the corresponding surface 72 of the mortise 70, along with the radiused edges 55 and 57, and the corresponding radiused "corners" 75 and 77.

The tapered dovetail joint structure of this invention can be used to join two components where the two components are in planes which are perpendicular or parallel to each other. However, the two components need not be in horizontal or vertical planes and they need not be perpendicular or parallel to each other. The planes containing the joint may have any direction relative to each other. However, if there is no net force acting downward at the joint the joint configuration would either have to be reversed or the joint would have to be pegged. To reverse the configuration would mean to have the top edges 11 and 29 be below the bottom edges 19 and 41. The load bearing strength of the components such as timbers are relatively unaffected by the joint system herein disclosed. The joint can be used to join or connect not only the various timber strutural components such as, for example, beams to beams, beams to posts, purlins to rafters, joists to joists, and rafters to ridge but the joint can be used to join wall panels to wall panels to form walls whether they be structure-wall panels or curtain-wall panels. The joint automatically captures and aligns the components being joined and where, for example a beam is being connected to a post or another beam, the connection can be made without elevating one component substantially above the second. The connection is made essentially in the horizontal plane. And further because of the unique combination of angles, initial lateral and/or vertical misalignment of the components being connected is permissible. When the connection is initially made the joint by virtue of the design causes the components to draw together, properly aligned and tightly interfitted.

It is thought that the tapered dovetail mortise and tenon joint structure of the present invention and many of its attendant advantages including its use in the interlocking of structural components with one another in the construction of a building structure, will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A tapered dovetail mortise and tenon joint structure comprising in combination: a first component and a second component, a tenon portion configured onto a first surface of said first component and extending gradually from said first surface, said tenon comprising; two side surfaces each having an inner defining edge and an outer defining edge and forming a third acute angle with said first surface, said outer defining edges meeting said inner defining edges at a top edge of said tenon portion, said top edge being substantially in the same plane as said first surface of said first component said inner edges downwardly sloping towards one another and lying in the plane of said first surface forming an acute angle therebetween said outer defining edges sloping downwardly from said top edge and outwardly from said first surface and toward one another forming respectively a first acute angle with said first surface and a second acute angle therebetween said two side surfaces terminating at a bottom surface, said bottom surface defined by an inner and an outer bottom edge and said bottom surface forming a fourth acute angle with said first surface, and outward end surface defined by said two outer defining edges, said outer bottom edge and said top edge; and a second surface of said second component having a mortise portion cavity therein, said mortise portion cavity comprising; interior walls and angles to match the contour of said side, outer end and bottom surfaces, said inner and outer defining edges top and bottom edges, and said first, second, third and fourth acute angles, all defining said tenon portion so that said tenon and said mortise portion, when interfitted, will be in a tightly interfitting relationship.

2. The tapered dovetail mortise and tenon joint structure according to claim 1 wherein said two side surfaces and said outward end surface are substantially planar.

3. The tapered dovetail mortise and tenon joint structure according to claim 2 wherein said fourth acute angle is greater than said third acute angle.

4. The tapered dovetail mortise and tenon joint structure according to claim 3 wherein said second acute angle is greater than about one degree and less than about ten degrees.

5. The tapered dovetail mortise and tenon joint structure according to claim 3 wherein said outer bottom edge of said tenon portion extends from said first surface less than about one-half the thickness dimension of said second component where said thickness is measured in a direction orthoganol to said second surface.

6. The tapered dovetail mortise and tenon joint structure according to claim 5 wherein said inner defining edges are shorter than the vertical dimension of said first surface of said first component.

7. The tapered dovetail mortise and tenon joint structure according to claim 6 wherein said bottom surface is substantially configured as one-half of a truncated cone.

8. The tapered dovetail mortise and tenon joint structure according to claim 7 wherein said first component and said second component is wood.

9. The tapered dovetail mortise and tenon joint structure according to claim 1 wherein said outward end surface is semi-elliptical and said two side surfaces are substantially planar.

10. The tapered dovetail mortise and tenon joint structure according to claim 9 wherein said second acute angle is greater than about one degree and less than about ten degrees.

11. The tapered dovetail mortise and tenon joint structure according to claim 10 wherein said outer bottom edge of said tenon portion extends from said first surface less than about one-half the thickness dimension of said second component where said thickness is measured in a direction orthoganol to said second surface.

12. The tapered dovetail mortise and tenon joint structure according to claim 11 wherein said inner defining edges are shorter than the vertical dimension of said first surface of said first component.

13. The tapered dovetail mortise and tenon joint structure according to claim 12 wherein said fourth acute angle is substantially equal to said third acute angle.

14. The tapered dovetail mortise and tenon joint structure according to claim 13 wherein said bottom surface is substantially configured as one-half of a truncated cone.

15. The tapered dovetail mortise and tenon joint structure according to claim 14 wherein said first component and said second component is wood.

16. A tapered dovetail mortise and tenon jont structure comprising in combination: a first component and a second component; a tenon portion configured onto a first surface of said first component said tenon portion comprising; an outward end surface sloping downwardly from a top edge, which top edge is in the plane of said first surface, and outwardly from said first surface said outward end surface slope forming a first acute angle between the plane of said outward end surface and said first surface of said first component, said outward end surface defined by said top edge, a first and a second outer edge and an outer bottom edge, said first and second outer edges sloping downwardly toward each other forming a second acute angle therebetween and said first and second outer edges terminating at the ends of said outer bottom edge; a first and a second inner edge sloping towards one another, and an inner bottom edge said first and second inner edge and said inner bottom edge each in the plane of said first surface, said first and second inner edges terminating at the top end at the junction of said top edge and said first and second outer edges, said first and second inner and outer edges defining a first and a second side surface each of said side surfaces forming a third acute angle with said first surface; a bottom surface defined by said two side surfaces, said outer bottom edge and said inner bottom edge and forming a fourth acute angle with said first surface;

a second surface of said second component having a mortise portion cavity therein, said mortise portion cavity comprising; an inward end surface sloping downwardly from a top mortise edge, which top mortise edge is in the plane of said second surface, and inwardly from said second surface said inward end surface slope forming an acute angle between the plane of said inward end surface and said second surface of said second component and said acute angle being substantially equal to said first acute angle of said tenon portion, said inward end surface defined by said top mortise edge, a first and a second inner mortise edge and an inner bottom mortise edge, said first and second inner mortise edges sloping downwardly toward each other forming another acute angle therebetween substantially equal to said second acute angle of said tenon portion and said first and second inner mortise edges terminating at the ends of said inner bottoms mortise edge; a first and a second outer mortise edge sloping towards one another, and an outer bottom mortise edge said first and second outer mortise edge and said outer bottom mortise edge each in the plane of said second surface, said first and second outer mortise edges terminating at the top end at the junction of said top mortise edge and said first and second inner mortise edges, said first and second inner and outer mortise edges defining a first and a second mortise side surface each of said mortise side surfaces forming yet another acute angle with said second surface and substantially equal to said third acute angle of said tenon portion; a bottom mortise surface defined by said two mortise side surfaces, said outer bottom mortise edge and said inner bottom mortise edge and forming a further acute angle with said second surface and substantially equal to said fourth acute angle of said tenon portion; and said tenon portion being tightly interfitted to said mortise portion thereby resulting in said tapered dovetail mortise and tenon joint structure.

17. The tapered dovetail mortise and tenon joint structure according to claim 16 wherein said first and second side surfaces and said first and second mortise side surfaces, and said outward end surface and said inward end surface are substantially planar.

18. The tapered dovetail mortise and tenon joint structure according to claim 17 wherein said fourth acute angle is greater than said third acute angle.

19. The tapered dovetail mortise and tenon joint structure according to claim 18 wherein said second acute angle is greater than about one degree and less than about ten degrees.

20. The tapered dovetail mortise and tenon joint structure according to claim 19 wherein said outer bottom edge of said tenon portion extends from said first surface less than about one-half the thickness dimension of said second component where said thickness is measured in a direction orthogonal to said second surface.

21. The tapered dovetail mortise and tenon joint structure according to claim 20 wherein said first and second inner defining edges and said first and second outer mortise edges are shorter than the vertical dimension of said first surface of said first component.

22. The tapered dovetail mortise and tenon joint structure according to claim 21 wherein said bottom surface and said bottom mortise surface are configured substantially as one-half of a truncated cone.

23. The tapered dovetail mortise and tenon joint structure according to claim 21 wherein said first component and said second component is wood.

24. The tapered dovetail mortise and tenon joint structure according to claim 16 wherein said outward end surface and said inward mortise end surface is semi-elliptical and said first and second side surfaces and said first and second mortise side surfaces are substantially planar.

25. The tapered dovetail mortise and tenon joint structure according to claim 24 wherein said second acute angle is greater than about one degree and less than about ten degrees.

26. The tapered dovetail mortise and tenon joint structure according to claim 25 wherein said outer bottom edge of said tenon portion extends from said first surface less than about one-half the thickness dimension of said second component where said thickness is measured in a direction orthoganol to said second surface.

27. The tapered dovetail mortise and tenon joint structure according to claim 26 wherein said first and second inner defining edges and said first and second outer mortise edges are shorter than the vertical dimension of said first surface of said first component.

28. The tapered dovetail mortise and tenon joint structure according to claim 27 wherein said fourth acute angle is substantially equal to said third acute angle.

29. The tapered dovetail mortise and tenon joint structure according to claim 28 wherein said bottom surface and said bottom mortise surface are configured substantially as one-half of a truncated cone.

30. The tapered dovetail mortise and tenon joint structure according to claim 29 wherein said first component and said second component is wood.

* * * * *